No. 671,472. Patented Apr. 9, 1901.
F. EIFFERT.
MUZZLE.
(Application filed Mar. 22, 1900.)
(No Model.)
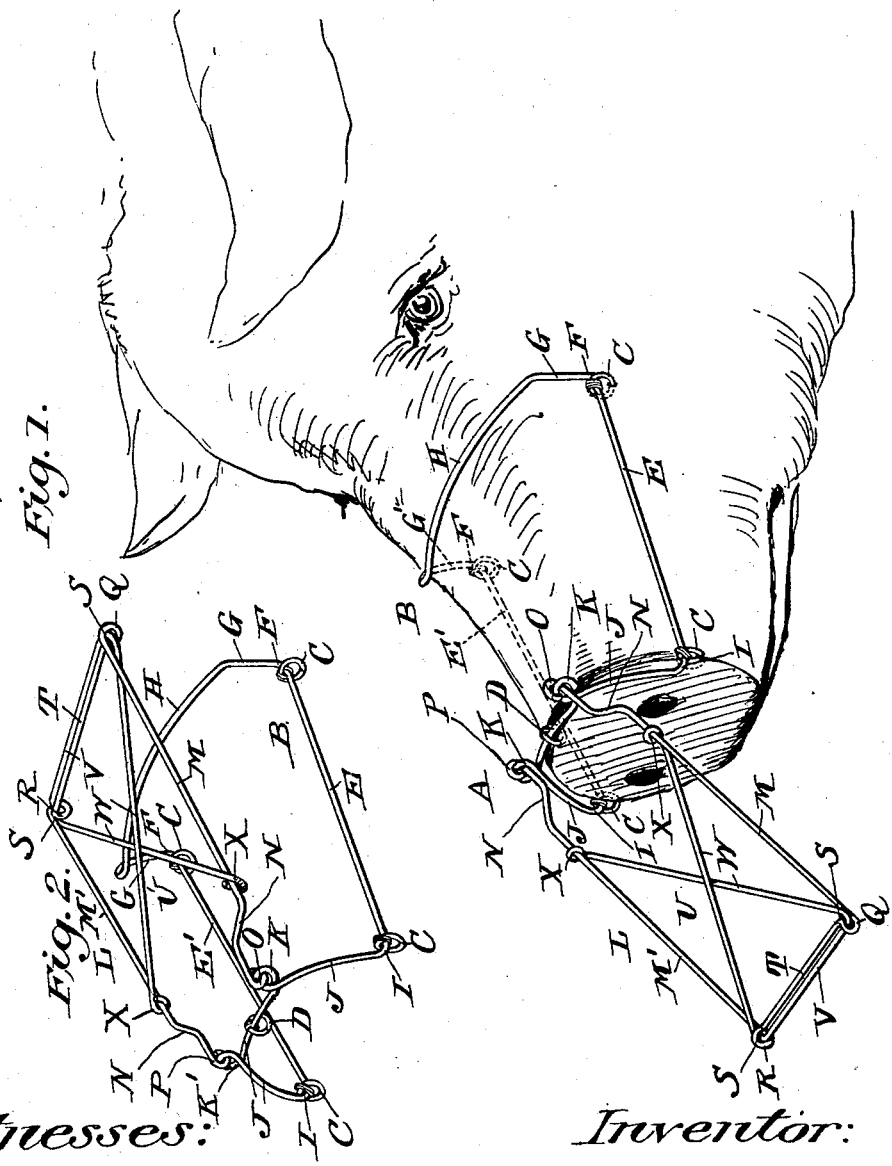

UNITED STATES PATENT OFFICE.

FRED EIFFERT, OF CLIFTON, MISSOURI.

MUZZLE.

SPECIFICATION forming part of Letters Patent No. 671,472, dated April 9, 1901.

Application filed March 22, 1900. Serial No. 9,825. (No model.)

*To all whom it may concern:*

Be it known that I, FRED EIFFERT, a citizen of the United States, residing at Clifton, in the county of Schuyler and State of Missouri, (post-office address Clifton, Missouri,) have invented certain new and useful Improvements in Muzzles, of which the following is a specification.

My invention relates to improvements in muzzles, more especially for hogs, but it may be used for other animals, and has for its object to provide a muzzle which is simple and inexpensive in construction, easy to manipulate, and which will prevent swine from rooting up the earth, opening gates, tearing down or injuring fences, and catching chickens and other animals.

My invention consists in the features and combination of features, as more fully hereinafter described and claimed.

Referring to the drawings, Figure 1 is a perspective view of a muzzle constructed in accordance with my invention and applied to the snout of a hog; Fig. 2, a perspective view of the muzzle with the movable or hinged member of the same thrown back on top of the stationary member.

In the drawings, in which like letters of reference denote like parts throughout the several views, A represents the muzzle, which may be made of wire or any other suitable material and of any desired size. B is the stationary member thereof, made of a shape to fit the contour of the upper portion of the hog's snout and not to interfere with its eyes and fastened to the snout by means of rings C at each corner and a ring D at the center of the front end. The frame B is preferably made in one piece, but it may be made in several pieces, and comprises two longitudinally-converging bars or arms E E', the rear portions of which are bent at F, turned upward to form vertical bars G G', and then formed into a forwardly-inclined arch H. The front portions of said bars are bent at I, turned up vertically and formed into an arch J, and then coiled into eyes K K'.

L is the movable or hinged member of the muzzle, which comprises two longitudinal bars or arms M M', the rear portions of which are bent diagonally inward at N and their ends terminating in eyes O P, formed by coiling said ends. The front portions of the said bars M M' are coiled and formed into eyes Q R, and after being bent at S terminate in a bar T.

U is a brace for the movable member, having a rear bar V, adapted to engage and be held in the eyes Q R. The brace U is preferably made in one piece, although it may be made in several pieces. Two cross-bars W, the ends of which terminate in eyes X, are secured to the bars M M' near their inner ends.

The eyes K K' of the movable member are adapted to engage the eyes O P of the stationary member, and thereby the two members are hinged together.

In use the muzzle is fitted over the snout of a hog or other animal and fastened thereto by rings or otherwise and does not in any way prevent its eating; but if it attempts to root in the ground, open gates, tear down fences, catch chickens, &c., the movable member, being in a position down in front of its snout and mouth, will prevent the same. The wounds inflicted in the snout of the hog by the rings with which the muzzle is fastened are only slight ones and soon heal up and do not cause any injury to the hog.

Although I have described my invention as being used as a muzzle, it may be used equally as well as a weaner for calves, colts, and other animals.

I do not wish to be limited to the exact construction as herein shown, as the same may be varied somewhat without departing from the spirit of my invention.

Having thus described my invention, what I claim is—

1. A muzzle consisting of a stationary member formed of side bars the opposite ends of which are connected by arches adapted to extend over and be supported on the top of the animal's nose so as to leave the lower jaw free, and a movable member hinged to one of said arches, substantially as shown and described.

2. A muzzle consisting of a stationary member formed of side bars the opposite ends of which are connected by arches adapted to extend over and be supported entirely on the top of the animal's nose so as to leave the lower jaw free, one of said arches having eyes at the top, and a movable member hinged to said eyes, substantially as shown and described.

3. A muzzle consisting of a stationary member formed of side bars the opposite ends of which are connected by arches, adapted to extend over and be supported on the top of the animal's nose so as to leave the lower jaw free, and a movable member hinged thereto having side bars the inner ends of which are bent diagonally inward, substantially as shown and described.

4. A muzzle having a stationary member, a movable member hinged thereto having side bars provided with eyes and a cross-bar at their lower portions, and a brace, the lower portion engaging said eyes, and the ends attached to said side bars, substantially as shown and described.

5. A muzzle having a stationary member, a movable member hinged thereto having side bars provided with eyes, and a connecting-bar, and a brace provided with cross-bars the ends of which are secured to the side bars and the connecting-bar engaging the eyes of the side bars, substantially as shown and described.

6. A muzzle consisting of a stationary member formed of side bars the opposite ends of which are connected by arches adapted to extend over and be supported on the top of the animal's nose so as to leave the lower jaw free, one of said arches being forwardly inclined, and the other arch provided with eyes at the upper portion, means for securing said stationary member in place, and a movable member hinged to one of said arches and provided with side bars the inner ends of which are bent diagonally inward, substantially as shown and described.

FRED EIFFERT.

Witnesses:
E. L. FRENCH,
W. F. JUSTICE.